US006981044B1

(12) United States Patent
Coez et al.

(10) Patent No.: US 6,981,044 B1
(45) Date of Patent: Dec. 27, 2005

(54) DOMESTIC SYSTEM RESOURCE ACCESS PRIORITY MANAGEMENT METHOD AND DEVICE FOR THE IMPLEMENTATION THEREOF

(75) Inventors: Fabienne Coez, Lyons (FR); Nicolas Fannechère, La Ciotat (FR)

(73) Assignee: Thomson Licensing S.A., Boulogne-Billancourt (FR)

(*) Notice: Subject to any disclaimer, the term of this patent is extended or adjusted under 35 U.S.C. 154(b) by 0 days.

(21) Appl. No.: 09/719,149

(22) PCT Filed: Jun. 8, 1999

(86) PCT No.: PCT/FR99/01358

§ 371 (c)(1),
(2), (4) Date: Mar. 13, 2001

(87) PCT Pub. No.: WO99/65190

PCT Pub. Date: Dec. 16, 1999

(30) Foreign Application Priority Data

Jun. 8, 1998 (FR) .................................. 98 07186

(51) Int. Cl.[7] .............................................. G06F 15/16
(52) U.S. Cl. ........................ 709/226; 709/225; 709/229
(58) Field of Search ............................... 709/223–226, 709/229, 227, 228

(56) References Cited

U.S. PATENT DOCUMENTS 5,717,747 A * 2/1998 Boyle et al. ............ 379/201.03
5,826,082 A * 10/1998 Bishop et al. ............... 718/104
5,884,028 A * 3/1999 Kindell et al. ............... 709/234
5,909,594 A * 6/1999 Ross et al. ..................... 710/20
6,006,303 A * 12/1999 Barnaby et al. ............. 710/244
6,105,057 A * 8/2000 Kuftedjian et al. ......... 709/213
6,260,058 B1 * 7/2001 Hoenninger et al. ........ 718/107
6,598,068 B1 * 7/2003 Clark ........................... 718/104

FOREIGN PATENT DOCUMENTS

EP           0535749      4/1993      ........... H02J 13/00
WO           98/17033     4/1998      ........... H04L 12/28

* cited by examiner

*Primary Examiner*—Moustafa M. Meky
*Assistant Examiner*—Yasin Barqadle
(74) *Attorney, Agent, or Firm*—Joseph S. Tripoli; Robert D. Shedd; Paul P. Kiel

(57) ABSTRACT

The subject of the invention is a process for managing priorities of access of applications to resources of devices linked by a communication network.

The process is characterized in that the said process comprises the steps:

of allocating, to each application, a level of priority of access to the resources of the network, the said levels comprising at least the following levels:

(a) a first access priority level for an application which is not under the direct control of a user, (b) a second access priority level for an application which can be commanded directly by a user, of authorizing preemption by a first application of access to a resource, which access was obtained previously by a second application, as a function of the respective access priorities of the first and second applications.

14 Claims, 2 Drawing Sheets

US 6,981,044 B1

DOMESTIC SYSTEM RESOURCE ACCESS PRIORITY MANAGEMENT METHOD AND DEVICE FOR THE IMPLEMENTATION THEREOF

BACKGROUND OF THE INVENTION

The invention relates to the management of priorities of access by applications to resources in a domestic communication network, as well as to a device for implementing the process.

In a domestic network, a number of devices are linked by a communication network and communicate by way of a common language. Such networks are evolving towards the transmission of audio and video data, and may for example be based on a serial bus of the IEEE 1394 type. The devices connected to the network may possess "resources", that is to say particular facilities. A television possesses for example a tuner, a cathode-ray screen, whilst a video recorder possesses a tuner and a recording facility. Since the resources of a device can be made available to other devices of the network (for example a video recorder records a transmission by controlling the tuner of the television), conflicts of access to resources may arise, a resource possibly receiving contradictory commands from various applications.

BRIEF SUMMARY OF THE INVENTION

The purpose of the invention is to propose management of access priorities.

The subject of the invention is a process for managing priorities of access of applications to resources of devices linked by a communication network, characterized in that the said process comprises the steps:

of allocating, to each application, a level of priority of access to the resources of the network, the said levels comprising at least the following levels:

(a) a first access priority level for an application which is not under the direct control of a user, (b) a second access priority level for an application which can be commanded directly by a user, of authorizing preemption by a first application of access to a resource, which access was obtained previously by a second application, as a function of the respective access priorities of the first and second applications.

According to a variant embodiment, a resource simultaneously allows accesses by at least N applications, N being greater than or equal to 1.

According to a variant embodiment, the preemption step is preceded by a negotiation phase during which the first application transmits a message to the second application asking it to agree to or to refuse to abandon the access in favour of the first application.

According to a first exemplary embodiment, a phase of preemption of an application having the second priority level by an application having the first priority level is always preceded by a negotiation phase.

According to the first exemplary embodiment, a phase of preemption of an application having the second priority level by an application having the second priority level is always preceded by a negotiation phase.

Specifically, according to the first exemplary embodiment, the second priority level is the level earmarked for applications controllable by the user. Given that its presence is assumed, a negotiation is conducted in the above case, before any preemption.

According to a second embodiment, there are provided at least three priority levels, the third priority level being higher than the second priority level, the latter being higher than the first priority level, there is a negotiation phase if the priority level of the first application is identical to or lower than the priority level of the second application.

According to the second embodiment, there is preemption directly without negotiation if the security level of the first application is higher than the security level of the second application.

According to a variant of the embodiments, an application making an attempt to reserve access for a resource already reserved by N client applications is placed in a queue, standing by for the freeing of the resource by one of the N client applications.

According to a variant of the embodiments, an application is placed on standby in a queue only if this is specified by this application in its access request.

The inventive process can furthermore include the steps:
of allocating a primary level of rights of access, for a given resource, to an application having requested access to this resource first,
of allocating a secondary level of rights of access to other applications reserving the said resource, the rights of access of the secondary level being such that they do not interfere with the rights of access of the primary level.

According to a variant embodiment, following a command transmitted by an application having a secondary level right of access to a resource, the resource itself determines whether this command does or does not interfere with the access rights of the primary level.

According to a variant embodiment, a resource agrees to any command received from the application having a primary level right of access to this resource, even if the execution of the command interferes with the commands previously received from an application having a secondary level of right of access.

According to a variant embodiment, preemption and/or negotiation is authorized only so as to force abandonment of an access held by an application having a primary access level.

It should be noted that the above characteristics pertaining to the concepts of primary and secondary access level, as well as the additional characteristics relating to these concepts described in what follows, shall subsequently be able to form the subject of an independent set of claims.

BRIEF DESCRIPTION OF THE DRAWINGS

Other characteristics and advantages of the invention will become apparent through the description of a nonlimiting exemplary embodiment illustrated by the appended figures in which.

In the various figures, the same elements bear identical references.

DETAILED DESCRIPTION OF THE INVENTION

Figure 1:
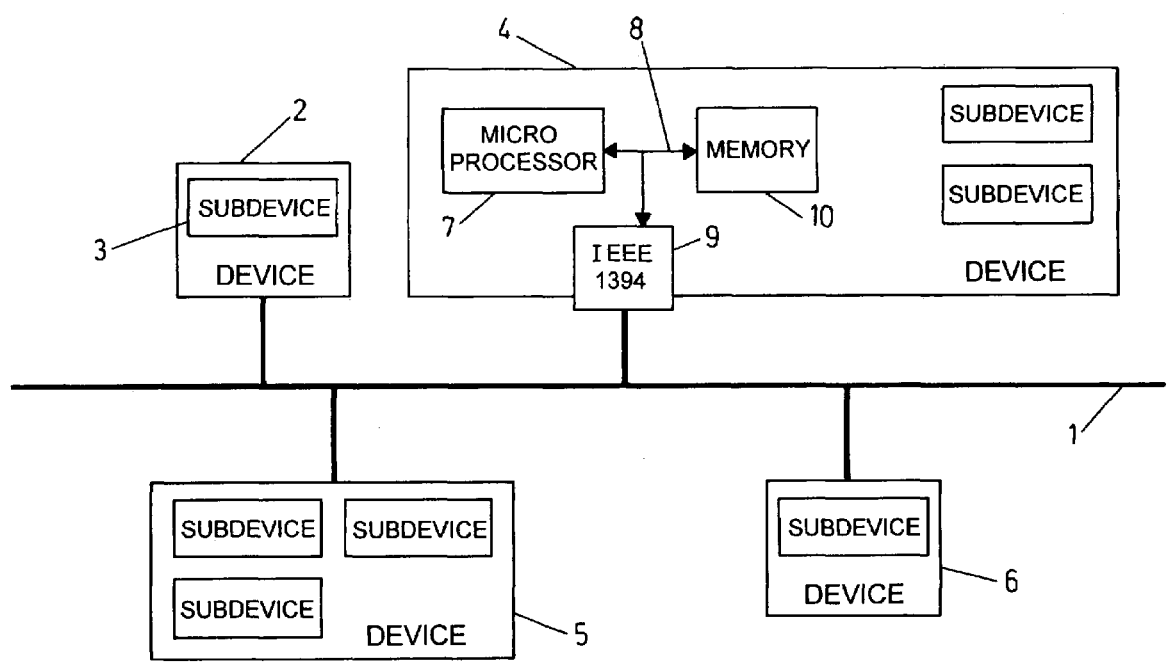
FIG. 1 is a block diagram of a network of devices implementing the process in accordance with the invention.

The network of FIG. 1 consists in the present exemplary embodiment of a serial bus complying with the IEEE 1394-1995 standard. This bus, referenced 1, links devices 2, 4, 5 and 6. The term "device" is understood to mean a physically separate apparatus linked to the network. Each device can include one or more subdevices, such as the subdevice 3. These subdevices can be resources, which are facilities of devices. The resources form software modules (or "software elements") within the meaning of the "HAVi" document mentioned later.

By way of example (see FIG. 2), a device A is a digital television decoder, whilst another device, the device B, is a video recorder. The decoder A possesses two resources, namely a tuner 12 and a demultiplexer 13. The video recorder B also possesses two resources: a tuner 14 and the recording facility 15. Each of the devices A and B includes an application (18 and 19 respectively) which is a graphical user interface, which enables a user to directly manage the facilities of each device. The user interface of the device A makes it possible according to the present exemplary embodiment to manage the recording, by another device of the network, of programs emanating from the demultiplexer 13. A resource can be resident, that is to say present right from the outset in a device, but can also be downloaded.

For the implementation of the facilities and protocols related to HAVi, each device possesses appropriate information processing, memory and connection means. The processing means can comprise a microprocessor 7 or a microcontroller or the like associated with various specialized circuits for more specific tasks (error correction, signal processing, demodulation, etc.). The memory means (10) can be fixed static or reprogrammable memories for containing the software kernel and/or downloaded segments of code and/or data. The memory means can also include removable storage devices such as microprocessor cards and PCMCIA-type cards, as well as hard disks or other means of storage. The connection means include among other things the interface to the IEEE 1394 bus, referenced 9 in FIG. 1. It is quite obvious that the invention is not limited to a particular structural implementation. According to the present description, the various elements of a device are linked by virtue of an internal bus 8. Quite obviously the subdevices also communicate with the internal bus, but have been illustrated separately, since these subdevices may be software applications executed by the microprocessor 7, as well as hardware segments separate from the microprocessor.

Each device also includes a registry (referenced 16, 17 respectively for each of the devices A and B). The registry forms the subject of a French patent application in the name of the applicant, filed on 23 Apr. 1998 and bearing the number 9805110. Another patent application relating to the subjectmatter of the present patent application is French patent application 9807187, filed on the priority date of the present application. This other patent application relates to the programming of actions of resources in a communication network.

Other aspects relating to the present invention are moreover described in the article "The HAVi Architecture—Specification of the Home Audio/Video interoperability (HAVi) Architecture" dated 11 May 1998 in version 0.8 thereof and made publicly available from 15 May 1998. A version 1.0 of this document is now available. Reference may also be made to these documents for fuller particulars regarding the various elements of the network, the present description being limited to the elements required to explain the invention.

The registry of a device (also referred to as the "local registry" for this device, as opposed to "remote registries" residing in other devices) participates in managing all the resources of this device. To this end, the registry includes a table in which the other resources of the device will be registered by indicating their attributes (type of resource, identifier of the resource in the network, etc.). When a software module has to communicate with another local software module, it can obtain the list of these modules by way of the local registry, which possesses a known local address. When a software module has to communicate with a remote software module of another device, it can obtain the address ("SEID") of the remote software module by going through the local registry. A software module can determine a list of modules corresponding to certain search criteria, independently of the location of these modules, by transmitting a request to the local registry which propagates this request to the remote registries. The request includes in the form of parameters the criteria for selecting the sought-after software modules, for example the type of module (display, recorder, etc.).

In this regard, the resources of a device are also registered at the level of the local registry, as are also the other software modules. A downloaded module is registered with the registry of the device which does duty as execution platform for this module.

The registry is a module which is according to the present exemplary embodiment a program stored in the memory 10 and implemented by the microprocessor 7 of a device.

An application may be of one of the following two profiles: User or Machine. The User profile corresponds to an application which is able to interact directly with the user, such as for example the graphical user interface 18 of the device A. The Machine profile corresponds to an application which is not controlled directly by a user, but which implements for example a programmed action. An application can control a resource. An application can also be a resource and in this regard be controlled by another application. According to the present exemplary embodiment, a User profile application will have precedence over a Machine profile application when concerned with resolving a resource reservation conflict. The User profile will be said to possess a higher priority level than the Machine profile.

A resource possesses a number of properties:

A resource can be of the so-called static or dynamic kind. A dynamic resource can be divided into several independent segments, by specifying suitable parameters. Typically, the passband is a dynamic resource: an application reserving a passband will have to specify the bandwidth to be reserved. A resource of the static kind is a resource which cannot be reserved in this way.

A dynamic resource will possess a reservation state which corresponds to the remaining amount available.

A static resource can be in one of three reservation states, a so-called available state, a so-called shared state and a so-called locked state. In the available state, the resource is not controlled by any application. In the shared state, the resource is controlled by at least one application, but other applications can nevertheless use the resource, with certain restrictions concerning the control commands allowed for these other applications. In the locked state, the resource is controlled by at least one application and will reject any control command originating from another application.

Moreover, with each resource there will be associated a descriptor, that is to say a data structure or registration, comprising values of variables identifying the facilities of the resource, as well as an address in the network. As already mentioned, this descriptor is registered at the level of the local registry.

According to the present exemplary embodiment, the resource descriptor indicates the domain of activity of the resource (for example audio/video, heating, household devices, etc.), the type of resource, which indicates its function (tuner, decoder, modem, etc.), the level of accessibility ("local" resource, accessible only by applications residing in the same device, or "public" resource, accessible also by applications executed on platforms other than the device in which the public application resides).

The management of the resources is based on a reservation mechanism. A reservation is necessary for the implementation of control commands and more generally for any write-access which changes the state of a resource. A reservation is not generally necessary for read-access. Once a reservation has been agreed to, the application becomes a client application of the resource: it has control thereof, but it is not necessarily the only application for which this is the case, hence the necessity for a mechanism for resolving conflicts of access to the resource.

Figure 2:
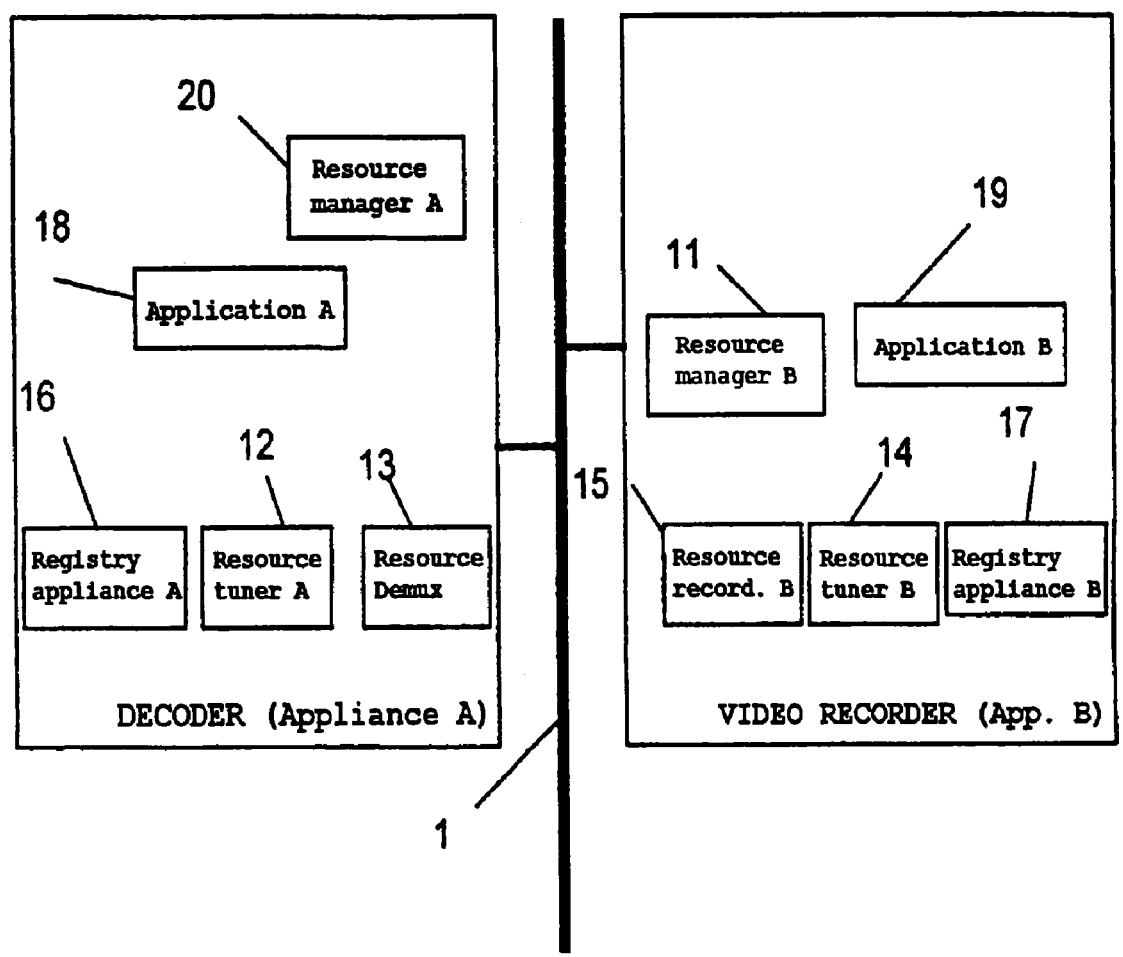
FIG. 2 is a diagram representing the logic organization of a device of FIG. 1.

Each device is furnished with a software module referred to as the "resource manager". In the network of FIG. 2, the resource managers of the devices A and B are referenced 20 and 11 respectively. These modules collaborate with the registries. The registries locally maintain a list of the software modules (resources, applications, etc.) available, and the resource manager manages the reservations for the local resources. The information maintained by the registries is relatively static, whilst that maintained by the resources is generally liable to evolve rapidly.

According to the present exemplary embodiment, a resource manager obtains the list of local, respectively remote, resources directly from the local registry, respectively from the local registry after the latter has despatched a request for information to the remote registries. The non-resident resources are thus easily accessible to the resource manager. For example, when a function control module ("FCM" according to the HAVi terminology) is downloaded from a base audio/video device ("BAV" according to the HAVi terminology), this control module is registered with the local registry of the device serving as its execution platform, such as an audio/video device with full facilities ("FAV").

The principles used for reservation are as follows:

before despatching a resource control command, an application must reserve this resource with the resource manager of the device in which the resource resides, and an application must free a resource which it is no longer using.

According to the present exemplary embodiment, an application wishing to make a reservation determines the address of the resource manager of the device in which the resource resides by way of the registry of the device in which the application resides. Once the address has been obtained, the application can contact the resource manager with a view to ascertaining the state of the resource. On the other hand, once the reservation has been obtained, the application which made this reservation obtains control of the resource and addresses its control commands directly to the resource. The resource manager is not contacted subsequently other than to indicate whether the resource needs to be freed.

Each resource maintains a data structure known as the "contention structure", which contains the following information:

(1) Static Information

This type of information does not a priori tend to evolve. This information can be requested by the resource manager from the resources.

(a) The resource control mode

The control mode can be one of the following: Transparent, Shareable, Exclusive.

(b) Maximum number of applications supported

This field is used for the case of the shareable or exclusive mode. The resource indicates the maximum number of applications simultaneously supported, the minimum being 1.

(2) Dynamic Information (a) Information relating to the applications controlling the resource Among the stored data relating to each application are:

the profile of the application (User or Machine), as appropriate, when dealing with a primary or secondary application (see below), so-called private data reserved for an as yet undefined use, a text field including a descriptive of the reason for the reservation (for example "Recording of channel Z").

(b) Current state of the resource: Available, Shared, Locked (c) Number of applications controlling the resource (d) List of applications controlling the resource (e) List of applications standing by waiting to be able to control the resource (for example because the maximum number of applications for this resource has been exceeded).

The applications, like the resources, are identified by an address defined in the HAVi document and bearing the name "SEID".

More specifically, the resource maintains a minimum of data relating to the applications which control it, with a view to implementing preemption and negotiation mechanisms. For the implementation of the mechanism for splitting into primary application and secondary applications, a resource stores at least the identifier of the primary application. In this regard reference may be made to Table 1 in particular.

In the case of the shareable control mode, the type of access authorized will also be indicated: splitting of applications into primary application and secondary applications, or equality of processing for all the applications.

In the Transparent control mode, the resource agrees to simultaneous control without restriction on the part of several applications, without making any distinction between the applications.

In the Shareable mode, several applications can control the resource at the same time, but this resource will implement resource sharing and access conflict resolution processes should there be a risk that the commands of the applications will lead to incorrect operation.

An example is that of the decoder A of FIG. 2. The tuner of this device is adjusted for the reception of a signal originating from a particular transponder, corresponding to a certain multiplexed stream. Within this stream, the demultiplexer has the capability of tagging the packets corresponding to one service or to another, and of extracting these packets towards the client applications. Assuming that a given stream conveys some ten services, separate applications can use the demultiplexer resource to access identical or different services. The demultiplexer then operates as a server. A conflict arises when an application wishes to change transponder: this implies that any other application will lose access to the services transmitted on the current transponder.

According to the invention, the preferred process for resolving such a conflict is as follows: the client applications of a resource are classed into primary and secondary client applications. A single application can be a primary application for a resource: it is initially the one which reserved the resource first. All the other applications are secondary applications. The resource accepts all the commands originating from the primary application, but can accept only certain commands, in a limited fashion, from the secondary applications. The commands of the secondary applications are taken into account only in so far as they do not come into conflict with the commands of the primary application. In the example of the demultiplexer given above, only the primary application has the possibility of changing transponder. The secondary applications merely have the right to choose a service on the current transponder.

According to a variant embodiment, the primary application informs its final user (for example the television viewer) of the disturbances that his action may cause. Returning to the example previously described, before allowing a user to change transponder, the primary application requests as appropriate from the resource managing the tuner in question the list of secondary applications, as well as the list of corresponding reservation reasons. These reasons are displayed for the attention of the user, who may or may not take the decision to proceed with the change of transponder, with the knowledge of the possible repercussions of his action.

According to the present exemplary embodiment, all the secondary applications have identical command possibilities. Two processes can be distinguished: according to the first process, an application cannot disturb the commands previously transmitted to the resource by another application ("principle of mutual respect"), whilst, according to the second process, one application can disturb another application.

In all cases, what constitutes a "disturbance" of a secondary application by another depends on the nature of the resource controlled and it is the latter which will have to be settled. According to the present exemplary embodiment, it is the principle of mutual respect which is implemented as regards conflicts of access between secondary applications.

According to a variant embodiment, as already mentioned in conjunction with the primary application, a secondary application advises, if necessary, the final user thereof of the restrictions imposed on the action thereof.

By way of example, for a shareable resource, Table 1 gives some of the information stored at the level of each resource:

TABLE 1

| Application | Profile | Access | Queuing |
|---|---|---|---|
| A1 | USER | Primary | No |
| A2 | MACHINE | Secondary | No |
| A3 | USER | Read | Yes |
| ... | | | |

In the Exclusive mode, the resource may only be controlled by a single application at a given moment. The resource stores at least the identity of this application, as well as its priority level (User or Machine type according to the present exemplary embodiment). By way of example, one may take the control of the mechanisms of a video recorder, such as the device B of FIG. 2. A conflict may arise if an application requests the recording of a transmission, whilst slightly later another application requests the ejection of the recording medium. In this case, the first application will have exclusive control.

Depending on the type of resource, the mode of access to a resource can differ for various commands. For example, only the commands which change the mode of operation of a resource can generate conflicts and therefore justify an exclusive or shareable control mode, whilst all the other commands, for example read accesses or event requests, are managed according to the transparent mode.

To reserve a resource, an application transmits a corresponding command to the resource manager local to the resource or to the manager local to the application itself. This command includes as parameters the application-related information subsequently written into the contention structure at the level of the resource. No reservation is made by an application in respect of a resource in transparent mode. According to the present example, a reservation is made in respect of the immediate obtaining of the control of a resource, that is to say the concept of time is not taken into account for the purpose of simplifying the present description. However, the principle is similar for conflicts of access of one and the same resource in respect of future periods which overlap. The patent application having the same priority date as the present application relates in particular to these reservations in respect of future periods.

According to the current state of the resource, three cases may occur:

The reservation is accepted and the application becomes the primary application or a secondary application. This is the case when the resource is initially in the available or shareable state respectively.

The reservation is rejected since the resource is locked (for example because the maximum number of applications has been reached). The application may request, in the form of a flag in the reservation command, that it be placed in the queue for this resource, and that it obtain notification from the resource manager when the latter has automatically allocated it a new access level (either a secondary access becomes a primary access, or an application in the queue becomes a secondary or primary application). The address of the application is then stored in a stack of the contention structure for the appropriate resource.

The placing of the application on standby if its profile is such that it allows it to negotiate the title of primary application with the current primary application. The negotiation or preemption mechanism is, according to the present example, implemented by way of the resource manager.

The resource manager transmits the result of the reservation back to the application. If the reservation is accepted, the message also includes the information as to whether the application is primary or secondary.

When the application has obtained control of the resource and has terminated its action, it transmits a resource-freeing command to the resource manager. The latter then erases the application and the information appertaining thereto of the appropriate contention structure.

This is also the case for an application standing by which no longer needs a resource in respect of which it has attempted to make a reservation in the past, it must free the resource.

According to the present exemplary embodiment, two mechanisms are provided for replacing a primary application by another application: preemption and negotiation. The type of mechanism is identified in the reservation command sent by an application to the resource manager. The preemption phase can be preceded by a negotiation phase.

When an application wishes to negotiate the status of primary application with the current primary application, it sends a message in this regard to the resource manager, which in turn transmits a message to the primary application. The latter can either agree to or refuse to give up its place. An application of User type can for example transmit the request to the user himself.

An application can also implement the preemption mechanism so as to appropriate the status of primary application. In this case, the resource manager verifies that this application does indeed have priority to make this request, relative to the priority of the current primary application. If it authorizes the preemption, the resource manager sends a transfer command which the primary application is obliged to accept. A given time is then accorded to the primary application to free the resource. If this time is not complied with, the resource manager effects the forceful transfer of the resource.

In conjunction with the mechanism for splitting client applications into primary application and secondary applications, the resolving of conflicts in respect of the position of primary application during reservation adheres to the following rules, given the standpoint of the case where only the User and Machine profiles exist:

(1) An application with User profile always has priority over an application with Machine profile.

(2) The first application reserving a shareable resource becomes the primary application. A primary application can interfere with the commands of secondary applications. A secondary application cannot interfere with a command of the primary application.

(3) An application with User profile is never subject to the right of preemption of another application (User or Machine) without a phase of negotiation.

(4) When a primary application frees a resource, it is the secondary application having the highest priority level which becomes the primary application. In the case where several secondary applications possess this priority level, it is the oldest application which becomes the primary application. An application on standby can then take the place of the secondary application.

Four cases of conflict may occur, depending on the profile of the primary application and that of the application seeking to make a reservation (it will be assumed here that there is negotiation whenever the primary application has the User profile):

(a) The primary application has a User profile and the application requesting reservation has a Machine profile:

In this case, the resource transmits a message to the User application to verify whether the latter can give way. This is the negotiation. If this is the case, the application with Machine profile becomes the primary application. Otherwise, the Machine application abandons its attempt.

An example corresponding to this case is that of a television viewer watching a service broadcast on a transponder A, whilst a preprogrammed video recorder is to record a service on a transponder B, using the same tuner.

(b) The primary application has a Machine profile and the application requesting reservation has a User profile:

Before replacing the Machine primary application with the User application, the resource manager informs the User application of the potential consequences of this replacement and requests that it confirm the replacement, while affording it the possibility of letting the primary application finish its task.

An example corresponding to this case is that where a video recorder is recording a service of a transponder A, whilst a television viewer wishes to watch a service on a transponder B, using the same tuner. The television viewer is then advised that the recording in progress will have to be halted if he confirms his decision.

(c) The primary application has a User profile and the application requesting the reservation also has a User profile:

In this case, the primary application will decide to keep or to abandon its primary level: the principle is the same as in case (a): there is negotiation.

An example corresponding to this case is that where a first television viewer is watching a service on a first transponder (of which he has control by way of a primary application), whilst a second television viewer wishes to watch another service of another transponder, using the same tuner. The second television viewer will only be able to adjust the tuner to the frequency of the new transponder with the agreement of the first television viewer.

(d) The primary application has a Machine profile and the application requesting the reservation also has a Machine profile:

Given that, according to the present example, all the applications with Machine profile have the same priority, the primary application terminates its task without being replaced.

According to a variant embodiment, other profiles of applications are provided for: Background, Installation, Security and System, corresponding respectively to low-priority applications occupied with background tasks (for example wiping of obsolete data), applications used during the installation and configuration of the network, applications informing the user of certain important events (security alarms for example), and system applications (for example the registries and the resource managers). When more than two profiles exist, the behaviour of the system is described in general by Table 2. In the variant embodiment, mentioned above, comprising more than two profiles, the Security and System profiles have by way of example higher priority levels than the User profile. There is never preemption of an application with User profile by an application of identical or lower priority level with no phase of negotiation. However, according to the example described by Table 2, there is no negotiation when the primary application has a User profile, but the application seeking to obtain control possesses a strictly higher priority level.

TABLE 2

| Profile/priority of the primary application | Priority of the application requesting reservation | Mechanism instigated by the resource manager | New primary application |
| --- | --- | --- | --- |
| User | Higher priority | Preemption | Application requesting reservation |
| User | Identical or lower priority | Negotiation | Current primary application or application requesting reservation |
| Priority different from User | Higher priority | Preemption | Application requesting reservation |
| Priority different from User | Identical or lower priority | Request denied or placed on standby | Current primary application |

What is claimed is:

1. Process for managing priorities of access of applications to resources of devices linked by a communication network, the process comprising:
   allocating, to each application, a level of priority of access to the resources of the network, the said levels comprising at least two levels of priority,
   a negotiation phase during which a first application requests abandonment, for the benefit of the first application, of a resource by a second application, wherein the second application agrees to abandon the resource or refuses to abandon the resource, and
   a preemption phase during which the first application preempts access to the resource by the second application as a function of the respective priorities of the first and second applications and as a function of the result of the negotiation.

2. Process according to claim 1, wherein a resource simultaneously allows accesses by at least N applications, N being greater than or equal to 1.

3. Process according to claim 1, wherein said priority levels include a first level for applications not under the direct control of a user and a second level for applications which can be controlled directly by a user.

4. Process according to claim 3, wherein a phase of preemption of an application having the second priority level by an application having the first priority level is always preceded by a negotiation phase.

5. Process according to claim 3, wherein a phase of preemption of an application having the second priority level by an application having the second priority level is always preceded by a negotiation phase.

6. Process according to claim 3, wherein there are provided at least three priority levels, the third priority level being higher than the second priority level, the latter being higher than the first priority level, there is a negotiation phase if the priority level of the first application is identical to or lower than the priority level of the second application.

7. Process according to claim 3, wherein there is preemption directly without negotiation if the security level of the first application is higher than the security level of the second application.

8. Process according to claim 2, wherein an application making an attempt to reserve access for a resource already reserved by N client applications is placed in a queue, standing by for the freeing of the resource by one of the N client applications.

9. Process according to claim 8, wherein an application is placed on standby in a queue only if this is specified by this application in its access request.

10. Process according to claim 1 furthermore including the steps:
    of allocating a primary level of rights of access, for a given resource, to an application having requested access to this resource first,
    of allocating a secondary level of rights of access to other applications reserving the said resource, the rights of access of the secondary level being such that they do not interfere with the rights of access of the primary level.

11. Process according to claim 10, wherein, following a command transmitted by an application having a secondary level right of access to a resource, the resource itself determines whether this command does or does not interfere with the access rights of the primary level.

12. Process according to claim 10, wherein a resource agrees to any command received from the application having a primary level right of access to this resource, even if the execution of the command interferes with the commands previously received from an application having a secondary level of right of access.

13. Process according to claim 10, wherein preemption and, as appropriate negotiation, is authorized only so as to force abandonment of an access held by an application having a primary access level.

14. Process according to claim 3, further comprising the step of requesting authorization of a user to abandon or not to abandon a resource reserved by an application of the second priority level during the negotiation step.

* * * * *